Patented Aug. 28, 1951

2,566,092

UNITED STATES PATENT OFFICE 2,566,092

PROCESSES FOR MAKING PAPER HAVING INSECTICIDAL PROPERTIES AND PRODUCTS RESULTING THEREFROM

Paul Mayfield, Wilmington, Del., assignor to Hercules Powder Company, Wilmington, Del., a corporation of Delaware No Drawing. Application December 7, 1946, Serial No. 714,912

7 Claims. (Cl. 117—154)

This invention relates to the preparation of paper having insecticidal properties and more particularly to a paper in which a polychloro bicyclic terpene containing from about 40% to 75% chlorine has been incorporated.

In accordance with this invention it has been found that paper or board having a high degree of insecticidal activity may be prepared by treating a fiber material with a polychloro bicyclic terpene containing from about 40% to about 75% chlorine.

The following examples are illustrative of the insecticidal paper and the process of treating the paper or paper fiber with the polychloro bicyclic terpene in accordance with this invention. All parts and percentages are by weight unless otherwise indicated.

Example I

A coating composition was prepared by melting together 100 parts of a polychloro camphene containing 68% chlorine and 400 parts of refined crude scale wax having a melting point of 122°–124° F. Using a Martinson Coater, sheets of 32 lb./ream kraft roll paper were coated with the above coating composition at 65°–70° C. at the rate of 11 lb./ream. Some of the sheets after coating were heated until the coating melted and was driven into the paper.

In this and the following examples the paper was tested for its insecticidal activity by the following method. The paper to be tested was made the top and bottom of a 3-inch diameter screen cylindrical cage which was ¼ inch high. Approximately 25 flies were introduced between the two surfaces with which they were in continuous contact. After all of the flies had been knocked down they were transferred to a nontoxic cage and held for the 24-hour count and compared with the control in which paper containing no insecticidal toxicant was used in the cage.

Samples of the paper coated as above described, both heated and unheated, were tested for their insecticidal activity against house flies by the above test. The heated paper had a 100% knockdown in 5 hours and the unheated paper a 100% knockdown in 3½ hours, whereas the control had no knockdown in 6 hours. Both of the coated papers had a 24-hour kill of 100% as compared with a 3.2% kill for the control.

Example II

A 32 lb./ream kraft paper was impregnated with a polychloro terpene by passing the paper through a 5% solution of a polychloro camphene, containing 67.8% chlorine, dissolved in benzene. The benzene was then evaporated with a current of warm air, leaving about 2 lb./ream of the polychloro camphene deposited in the paper.

This paper when tested for its insecticidal activity against house flies was found to have a 100% knockdown in 4 hours and a 24-hour kill of 100% as compared with no knockdown in 6 hours and a kill of 3.2% for the control.

Example III

A benzene emulsion containing 10% of a polychloro camphene was prepared by dissolving 39 parts of a polychloro camphene containing 67.8% chlorine and 39 parts of Tween 81 (trade name for sorbitan monooleate polyoxyalkylene derivative) in 117 parts of benzene and then adding 195 parts of water with mechanical agitation.

A 32 lb./ream kraft paper was coated with the above emulsion on a Martinson Coater. The paper was then dried in a current of warm air, about 2.5 lb./ream of dry material having been deposited on the paper.

This paper when tested for its insecticidal activity against house flies was found to have a 100% knockdown in 4½ hours and a 24-hour kill of 100%, compared to no knockdown in 6 hours and a kill of 3.2% for the control.

Example IV

A resin emulsion containing 10% of a polychloro camphene was prepared by melting together at 65°–70° C. 17.5 parts of Span 40 (trade name for sorbitan monopalmitate) and 17.5 parts of Tween 40 (trade name for sorbitan monopalmitate polyoxyalkylene derivative) and then adding 150 parts of the methyl ester of hydrogenated rosin and finally 50 parts of a polychloro camphene containing 67.8% of chlorine. When the mixture was homogeneous, 265 parts of water at the same temperature of 65°–70° C. were added with mechanical agitation.

A 32 lb./ream kraft paper was coated with the above emulsion on a Martinson Coater at the rate of 10 lb./ream and of 15 lb./ream. The paper was then dried in a current of warm air and tested for its insecticidal activity. The 10 lb./ream coated paper had a 100% knockdown in 6 hours and the 15 lb./ream coated paper had a 100% knockdown in 5 hours, whereas the control had no knockdown in 6 hours. Both of the coated papers had a 24-hour kill of 100% compared to a 24-hour kill of 3.2% for the control.

Example V

A clay coating color was prepared by mixing 100 parts of clay, 152 parts of water, 14 parts of casein, and 2 parts of soda ash. To this coating color was added 100 parts of a benzene emulsion of a polychloro camphene containing 67.8% chlorine and prepared as described in Example III.

A 32 lb./ream kraft paper was coated at the rate of 20 lb./ream of this coating color, using a Martinson Coater. After drying the paper in a current of warm air it was tested for insecticidal activity against house flies and was found to have a 24-hour kill of 100% compared to 3.2% for the control.

Example VI

A lacquer containing a polychloro camphene, having a chlorine content of 67.8%, was prepared according to the following formula:

|  | Parts |
| --- | --- |
| Ethyl cellulose N–50 | 50 |
| Ester gum 8L | 25 |
| Diethyl phthalate | 15 |
| Polychloro camphene | 20 |
| Benzene | 220 |
| Butanol | 30 |
| Butyl cellulose | 22 |

A 32 lb./ream kraft paper was coated with this lacquer at the rate of 7 lb./ream on a Martinson Coater and then dried in a current of warm air. When tested for its insecticidal activity, this paper had a 24-hour kill of 100% compared to the 3.2% kill for the control.

Example VII

A wax emulsion containing a polychloro camphene, having a chlorine content of 67.8%, was prepared by adding 80 parts of the polychloro camphene to 1920 parts of a commercial aqueous crude scale wax emulsion (an amount equivalent to about 320 parts of wax).

A 32 lb./ream kraft paper was coated with this wax emulsion at the rate of 4 lbs. of solids per ream on a Martinson Coater. The paper was then dried in a current of warm air and when tested for its insecticidal activity was found to have a 24-hour kill of 100% compared to a 3.2% kill for the control.

Example VIII

A polychloro camphene containing 67.8% chlorine was deposited on diatomaceous silica by dispersing 20 parts of the silica in 75 parts of a 6.7% solution of the polychloro camphene in benzene. The benzene was then evaporated and the silica was ground to pass through a 100-mesh screen. The polychloro camphene content of this powder was 20%.

To a paper furnish containing 2.6% bleached sulfite pulp (1920 parts) was added 12.5 parts of the above diatomaceous silica-polychloro camphene powder. After adding 1.5% dry rosin size in a 3% emulsion and sufficient alum in a 12% solution to adjust to pH to 4.4–4.6, the sized pulp was run out and made into handsheets. The paper so prepared contained 5% polychloro terpene by weight.

This paper was tested for its insecticidal activity and found to have a 24-hour kill of 100% against house flies.

Example IX

Twenty-five parts of a benzene emulsion containing 10% polychloro camphene and prepared as described in Example III were added to 1920 parts of a 2.6% bleached sulfite pulp to form a furnish containing 5% polychloro camphene based on the weight of dry pulp. After adding 1.5% dry rosin size in a 3% emulsion and sufficient alum to adjust the pH to 4.4–4.6, the sized pulp was run out and made into handsheets. When tested for its insecticidal activity this paper had a 24-hour kill of 100% against house flies as compared with a 3.2% kill for the control.

The polychloro bicyclic terpenes, used in accordance with this invention in the preparation of paper having insecticidal properties, are prepared by chlorinating a bicyclic terpene until the terpene contains from about 40% to about 75% chlorine and preferably from about 60% to about 72% chlorine. Polychloro bicyclic terpenes containing less than 40% chlorine are not sufficiently active to impart insecticidal properties to paper. The same thing is true for polychloro bicyclic terpenes containing more than 75% chlorine.

Polychloro bicyclic terpenes which may be used to impart insecticidal properties to paper are polychloro camphenes prepared by chlorinating camphene, camphene hydrochloride and isocamphene; polychloro pinanes prepared by chlorinating pinane and pinene hydrochloride; polychloro camphenes which are prepared by chlorinating such compounds as camphene, pinene, bornyl chloride and isobornyl chloride; and chlorinated fenchenes.

The polychloro bicyclic terpenes may be incorporated into paper or board, in order to impart insecticidal properties to the paper or board, by treating the paper or paper fiber with the polychloro bicyclic terpene by any convenient method which will leave a deposit of the polychloro terpene on the fiber material making up the paper or in the paper or on its surface.

A convenient method of incorporating a polychloro bicyclic terpene in paper is to add the toxicant, in the form of a dispersible powder, a solution, an aqueous emulsion, or an organic solvent emulsion, to a paper furnish, as while in the beater, and then forming a paper from such a treated furnish. Paper formed from a furnish to which a polychloro bicyclic terpene has been added, contains the toxicant in the finished paper and has a high degree of insecticidal activity.

Another method of incorporating a polychloro bicyclic terpene in paper is to apply to paper a coating composition which contains the toxicant. Any type of coating composition may be used for this purpose. For example, the polychloro bicyclic terpene may be added to wax and the paper dipped or coated by any means with the molten wax composition. The polychloro bicyclic terpene may also be added to a paint such as a lacquer, a clay coating color, etc., used in the decoration of paper for wallpaper, etc. The toxicant may also be applied as a coating in the form of an emulsion such as a resin emulsion, an organic solvent emulsion or a wax emulsion, which contains the polychloro terpene. Any means of applying the coating composition may be used as by a coating machine, a simple painting operation, etc.

The polychloro bicyclic terpene may also be dissolved in an organic solvent such as benzene, toluene, xylene, gasoline, carbon tetrachloride, chloroform, alcohol, etc., and applied to paper by immersing in or passing the paper through the solution and evaporating the solvent from the paper.

Paper or board which has been treated with a polychloro bicyclic terpene, as by adding the toxicant to the furnish or by coating the paper or board with a composition containing the toxicant, has a very high degree of insecticidal activity. As little as 1% by weight of the paper of the polychloro bicyclic terpene is sufficient to give an excellent kill when insects are in contact with the paper. Usually from about 3% to 10% is a practical amount to be used to attain the desired activity. However, more may be used if desired for specific purposes. This insecticidal activity of the paper is a prolonged action and retains its activity even after many months of exposure under normal conditions.

Paper and board into which a polychloro bicyclic terpene has been incorporated is useful as wallpaper, permanent record paper, wrapping and bag paper, lining paper, insulating-bat wrapping, and for making storage bags, closets and cartons.

What I claim and desire to protect by Letters Patent is:

1. In a process for the manufacture of paper having insecticidal properties, the step which comprises coating paper with a composition containing a chlorinated bicyclic terpene containing from about 40% to about 75% chlorine, the amount of said terpene present in the coated paper being at least 1% by weight of the paper, whereby the paper is rendered toxic to insects.

2. In a process for the manufacture of paper having insecticidal properties, the step comprising the addition of a chlorinated bicyclic terpene, containing from about 40% to about 75% chlorine, to the paper furnish in the amount of at least 1% by weight of the paper fibers, whereby the paper is rendered toxic to insects.

3. A paper having insecticidal properties comprising a fibrous paper having incorporated therewith a chlorinated bicyclic terpene containing from about 40% to about 75% chlorine, the amount of said terpene present being at least 1% by weight of the paper, whereby the paper is toxic to insects.

4. A paper as in claim 3 in which the chlorinated bicyclic terpene is incorporated with the paper as a coating thereon.

5. A paper as in claim 3 in which the chlorinated bicyclic terpene is substantially uniformly distributed throughout the paper.

6. A paper having insecticidal properties comprising a fibrous paper having incorporated therewith a chlorinated camphene containing from about 60% to about 72% chlorine, the amount of said camphene present being at least 1% by weight of the paper, whereby the paper is toxic to insects.

7. In a process for the manufacture of paper having insecticidal properties, the step comprising the incorporation of a chlorinated bicyclic terpene containing from about 40% to about 75% chlorine with the fiber, the amount of said terpene present being at least 1% by weight of the paper, whereby the paper is toxic to insects.

PAUL MAYFIELD.

REFERENCES CITED

The following references are of record in the file of this patent:

UNITED STATES PATENTS

| Number | Name | Date |
|---|---|---|
| 1,366,106 | Weeks | Jan. 18, 1921 |
| 2,030,653 | Quinn | Feb. 11, 1936 |
| 2,071,822 | Ellis | Feb. 23, 1937 |
| 2,143,043 | Wexler | Jan. 10, 1939 |
| 2,185,954 | Ryner | Jan. 2, 1940 |
| 2,488,590 | Evans et al. | Nov. 22, 1949 |

FOREIGN PATENTS

| Number | Country | Date |
|---|---|---|
| 4,558 | Great Britain | 1889 |
| 624,176 | Great Britain | May 30, 1949 |

OTHER REFERENCES

Cotton et al.: Journal of Economic Entomology, vol. 37, No. 1, page 140, February 1944.

Journal Textile Institute, October 1944, page A419.

O. S. R. D. Committee on Medical Research Report No. 26, Sec. 1, October 31, 1945, page 5.